(12) United States Patent
Kanamarlapudi et al.

(10) Patent No.: US 11,777,655 B2
(45) Date of Patent: Oct. 3, 2023

(54) ACKNOWLEDGMENT SHAPING FOR DOWNLINK DATA BURSTS

(71) Applicant: QUALCOMM Incorporated, San Diego, CA (US)

(72) Inventors: Sitaramanjaneyulu Kanamarlapudi, San Diego, CA (US); Alok Mitra, San Diego, CA (US); Darshan Ashar, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/319,995

(22) Filed: May 13, 2021

(65) Prior Publication Data

US 2021/0409158 A1    Dec. 30, 2021

Related U.S. Application Data

(60) Provisional application No. 63/046,641, filed on Jun. 30, 2020.

(51) Int. Cl.
*H04L 1/1607* (2023.01)
*H04W 72/0446* (2023.01)

(52) U.S. Cl.
CPC ....... *H04L 1/1607* (2013.01); *H04W 72/0446* (2013.01)

(58) Field of Classification Search
CPC ... H04L 1/1607; H04L 1/1861; H04L 1/1841; H04L 1/1854; H04W 72/0446
See application file for complete search history.

(56) References Cited

U.S. PATENT DOCUMENTS

| | | | | |
|---|---|---|---|---|
| 7,388,835 | B1* | 6/2008 | Chen | H04L 12/66 370/465 |
| 10,560,391 | B2* | 2/2020 | Pan | H04L 47/30 |
| 2015/0334596 | A1* | 11/2015 | Szilagyi | H04L 47/12 370/232 |
| 2019/0222528 | A1* | 7/2019 | Pan | H04L 49/90 |
| 2021/0328728 | A1* | 10/2021 | El Hamss | H04L 5/0091 |

FOREIGN PATENT DOCUMENTS

WO    2021030590    2/2021

OTHER PUBLICATIONS

International Search Report and Written Opinion—PCT/US2021/032412—ISA/EPO—dated Aug. 23, 2021.

* cited by examiner

*Primary Examiner* — Nishant Divecha
(74) *Attorney, Agent, or Firm* — Patterson & Sheridan LLP

(57) ABSTRACT

Certain aspects of the present disclosure provide a technique executed by a user equipment (UE) for obtaining a burst of transmission control protocol (TCP) packets conveying packet data convergence protocol (PDCP) protocol data units (PDUs) by an application protocol TCP layer of a communication protocol stack of the UE. The UE may then determine a first number of a first plurality of acknowledge (ACK) tokens to transmit in a first transmission time interval (TTI) based on an amount of data used to ACK the burst of TCP packets. The UE may then transmit the first plurality of ACK tokens in the first TTI and a single ACK token in a second TTI subsequent to the first TTI.

27 Claims, 14 Drawing Sheets

ACKNOWLEDGMENT SHAPING FOR DOWNLINK DATA BURSTS

CROSS-REFERENCE TO RELATED APPLICATION

This application claims benefit of and priority to U.S. Provisional Patent Application No. 63/046,641, filed Jun. 30, 2020, which is hereby incorporated by reference in its entirety.

BACKGROUND

Field of the Disclosure

Aspects of the present disclosure relate to wireless communications, and more particularly, to techniques for user equipments (UEs) to shape acknowledgments (ACKs) for downlink (DL) data bursts.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved uplink (UL) transport protocol acknowledgment (ACK) shaping and downlink (DL) data at a user equipment (UE) modem to avoid sending a large burst of transport protocol ACKs that could lead to overflow a buffer at a base station (BS).

Certain aspects of the subject matter described in this disclosure can be implemented in a method for wireless communication. The method generally includes obtaining a burst of transmission control protocol (TCP) packets conveying packet data convergence protocol (PDCP) protocol data units (PDUs) by an application protocol TCP layer of a communication protocol stack of the UE. The method generally includes determining, based on an amount of data used to ACK the burst of TCP packets, a first number of a first plurality of ACK tokens to transmit in a first transmission time interval (TTI). The first plurality of ACK tokens corresponds to first data in one or more TCP packets of the burst of TCP packets. The method generally includes transmitting the first plurality of ACK tokens in the first TTI. The method generally includes transmitting a single ACK token in a second TTI subsequent to the first TTI. The single ACK token corresponds to second data in one or more TCP packets of the burst of TCP packets.

Certain aspects of the subject matter described in this disclosure can be implemented in an apparatus for wireless communication. The apparatus may include means for obtaining a burst of TCP packets conveying PDCP PDUs by an application protocol TCP layer of a communication protocol stack of the UE; means for determining, based on an amount of data used to ACK the burst of TCP packets, a first number of a first plurality of ACK tokens to transmit in a first TTI. The first plurality of ACK tokens corresponds to first data in one or more TCP packets of the burst of TCP packets. The apparatus generally includes means for transmitting the first plurality of ACK tokens in the first TTI. The apparatus generally includes means for transmitting a single ACK token in a second TTI subsequent to the first TTI. The single ACK token corresponds to second data in one or more TCP packets of the burst of TCP packets.

Certain aspects of the subject matter described in this disclosure can be implemented in an apparatus for wireless communication. The apparatus may include a memory and at least one processor coupled with the memory. The at least one processor is generally configured to obtain a burst of TCP packets conveying PDCP PDUs by an application protocol TCP layer of a communication protocol stack of the apparatus. The at least one processor is generally configured to determine, based on an amount of data used to ACK the burst of TCP packets, a first number of a first plurality of ACK tokens to transmit in a first TTI. The first plurality of ACK tokens corresponds to first data in one or more TCP packets of the burst of TCP packets; transmit the first plurality of ACK tokens in the first TTI. The at least one processor is generally configured to transmit a single ACK token in a second TTI subsequent to the first TTI. The single ACK token corresponds to second data in one or more TCP packets of the burst of TCP packets.

Certain aspects of the subject matter described in this disclosure can be implemented in a computer readable medium storing computer executable code thereon for wireless communication. The computer readable medium generally includes code for obtaining a burst of TCP packets conveying PDCP PDUs by an application protocol TCP layer of a communication protocol stack of the apparatus. The computer readable medium generally includes code for determining, based on an amount of data used to ACK the burst of TCP packets, a first number of a first plurality of ACK tokens to transmit in a first TTI. The first plurality of ACK tokens corresponds to first data in one or more TCP packets of the burst of TCP packets. The computer readable medium generally includes code for transmitting the first plurality of ACK tokens in the first TTI. The computer readable medium generally includes code for transmitting a single ACK token in a second TTI subsequent to the first TTI. The single ACK token corresponds to second data in one or more TCP packets of the burst of TCP packets.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. The appended drawings illustrate only certain aspects of this disclosure, the description may admit to other effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
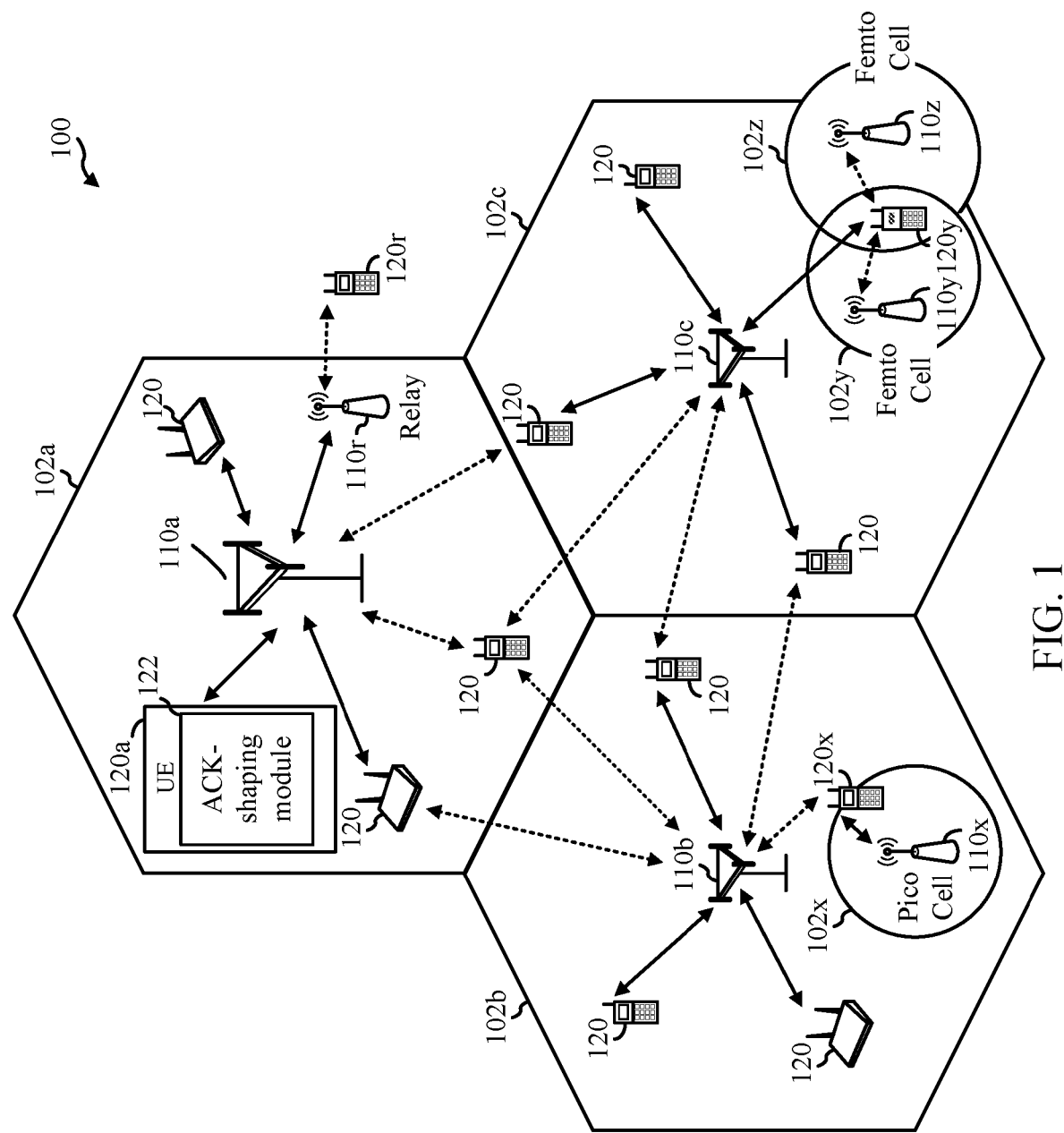
FIG. 1 is a block diagram conceptually illustrating an example telecommunications system, in accordance with certain aspects of the present disclosure.
Figure 1:
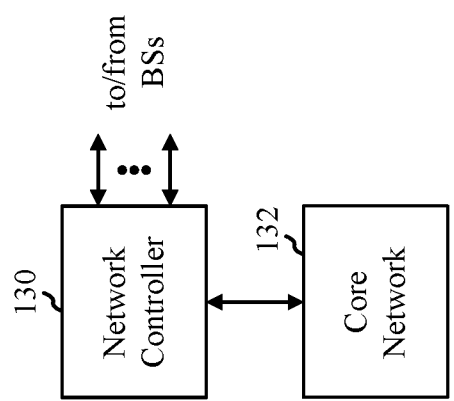

Aspects of the present disclosure provide apparatus, methods, processing systems, and computer readable mediums for user equipments (UEs) to shape acknowledgments (ACKs) in response to downlink (DL) data bursts. In an example, the DL data bursts may occur during a satellite communication.

According to aspects of the present disclosure, an example of an ACK shaping algorithm (e.g., as executed by a UE) works on a token based logic. A token size can be determined based on a configured DL data rate for the UE. For example, a UE may be configured with a DL data rate of 4 gigabits per second (Gbps), equivalent to 500 kilobytes per millisecond (KB/ms), and tokens may be generated at a rate sufficient to acknowledge quantities of data of 500 KB/ms. When there are transport control protocol (TCP) ACKs pending for an uplink (UL) transmission, then a token bucket algorithm may be employed. Following a token bucket algorithm, the UE may send the ACKs when sufficient tokens are pending for the UL transmission or, if there are not sufficient tokens, the UE keeps acquiring tokens until there are sufficient tokens to send the ACKs. If there are no TCP ACKs pending for the UL transmission, then the number of outstanding tokens is 0. A UE (e.g., a radio front end of the UE) may start building tokens after a first arrival of a TCP ACK for the UL transmission.

In aspects of the present disclosure, a UE may use an ACK shaping algorithm to send TCP ACKs in an UL in a smooth manner over time, which eases buffering requirements as well as scaling easily with changing size of a TCP transmit window.

As will be described in more detail herein, UL transport protocol ACK shaping may include obtaining, by an application protocol AP TCP layer of a communication protocol stack of the UE, a burst of TCP packets that convey packet data convergence protocol (PDCP) protocol data units (PDUs). The UL transport protocol ACK shaping may include determining, based on an amount of data used to acknowledge the TCP packets, a first number of first ACK tokens to transmit in a first transmission time interval (TTI) in response to the TCP packets, where each of the first ACK tokens corresponds to first data in one or more of the TCP packets in the burst. The UL transport protocol ACK shaping may include transmit the first number of first ACK tokens in the first TTI. The UL transport protocol ACK shaping may include transmitting one second ACK token in a second TTI subsequent to the first TTI where the second ACK token corresponds to second data in one or more of the TCP packets in the burst.

The following description provides examples for UEs to shape ACKs in response to DL data bursts. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "example" is used herein to mean "serving as an example, instance, or illustration." Any aspect described herein as "example" is not necessarily to be construed as preferred or advantageous over other aspects.

Example Telecommunications System

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

FIG. 1 illustrates an example wireless communication network 100 in which aspects of the present disclosure may be performed. For example, the wireless communication network 100 may be a NR system (e.g., a 5G NR network). As shown in FIG. 1, the wireless communication network 100 may be in communication with a core network 132. The core network 132 may in communication with one or more base station (BSs) 110a-z (each also individually referred to herein as a BS 110 or collectively as BSs 110) and/or user equipments (UEs) 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to a location of a mobile BS 110. In some examples, the BSs 110 may be interconnected to one another and/or to one or more other BSs or network nodes (not shown) in the wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple cells. The BSs 110 communicate with UEs 120. The UEs 120 (e.g., 120x, 120y, etc.) may be dispersed throughout the wireless communication network 100, and each UE 120 may be stationary or mobile.

According to certain aspects, the BSs 110 and UEs 120 may be configured for uplink (UL) and downlink (DL) transmissions. The BS 110a may serve as a link between the UE 110a and a transport protocol server. The UE 110a may be configured to perform UL transport protocol acknowledgement (ACK) shaping and/or DL data shaping. As shown in FIG. 1, the UE 120a includes an ACK-shaping module 122. The ACK-shaping module 122 may be configured to obtain a burst of transmission control protocol (TCP) packets conveying packet data convergence protocol (PDCP) protocol data units (PDUs) by an application protocol (AP) TCP layer of a communication protocol stack of the UE; determine, based on an amount of data used to acknowledge the TCP packets received as PDCP PDUs, a first number of first ACK tokens to transmit in a first transmission time interval (TTI) in response to the TCP packets where each of the ACK tokens corresponds to first data in one or more of the TCP packets in the burst; transmit the first number of first ACK tokens in the first TTI; and transmit one second ACK token in a second TTI subsequent to the first TTI where the second ACK token corresponds to second data in one or more of the TCP packets in the burst, in accordance with aspects of the present disclosure.

The wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between the wireless devices.

A network controller 130 may couple to a set of BSs 110 and provide coordination and control for these BSs 110. The network controller 130 may communicate with the BSs 110 via a backhaul. In aspects, the network controller 130 may be in communication with a core network 132.

Figure 2:
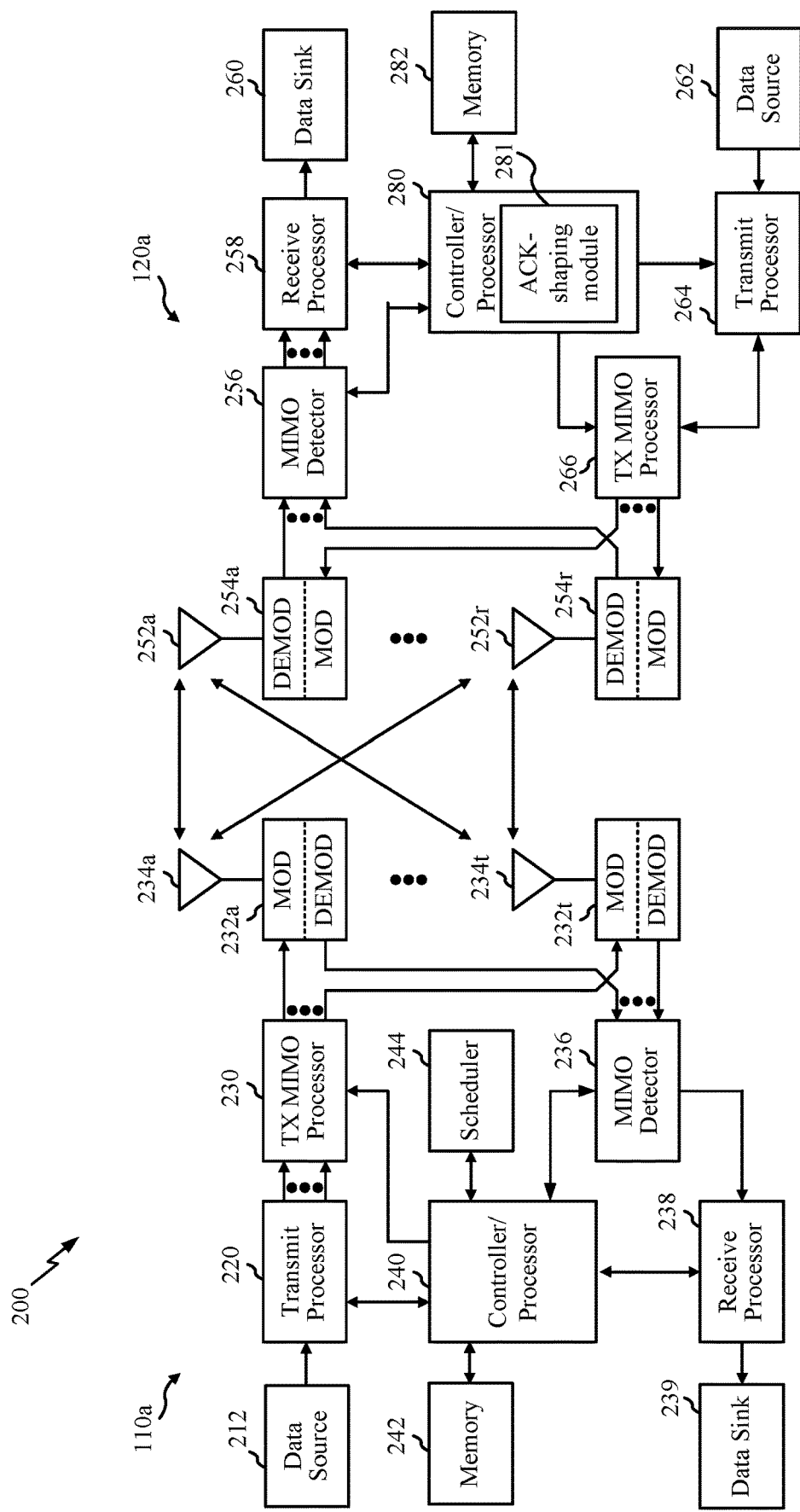
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) data and control information to obtain data symbols and control symbols, respectively. The transmit processor 220 may also generate reference symbols, such as for a primary synchronization signal (PSS), a secondary synchronization signal (SSS), a PBCH demodulation reference signal (DMRS), and a channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a downlink signal. Downlink signals from MODs in transceivers 232a-232t may be transmitted via antennas 234a-234t, respectively.

At the UE 120a, antennas 252a-252r may receive downlink signals from the BS 110a and may provide received signals to demodulators (DEMODs) in transceivers 254a-254r, respectively. Each DEMOD in transceivers 254a-254r may condition (e.g., filter, amplify, downconvert, and digitize) a respective received signal to obtain input samples. Each DEMOD in transceivers 254a-254r may further process the input samples (e.g., for OFDM, etc.) to obtain received symbols. A MIMO detector 256 may obtain received symbols from all the DEMODs in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at the UE 120a, a transmit processor 264 may receive and process data (e.g., for the PUSCH) from a data source 262 and control information (e.g., for a physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the DEMODs in transceivers 254a-254r (e.g., for SC-FDM, etc.), and transmitted to the BS 110a. At the BS 110a, the uplink signals from the UE 120a may be received by the antennas 234, processed by the MODs in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or the uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an ACK-shaping module 281 that may be configured for shaping the delivery of ACKs for UL transmission, according to certain aspects described herein. Although shown at the controller/processor, other components of the UE 120a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
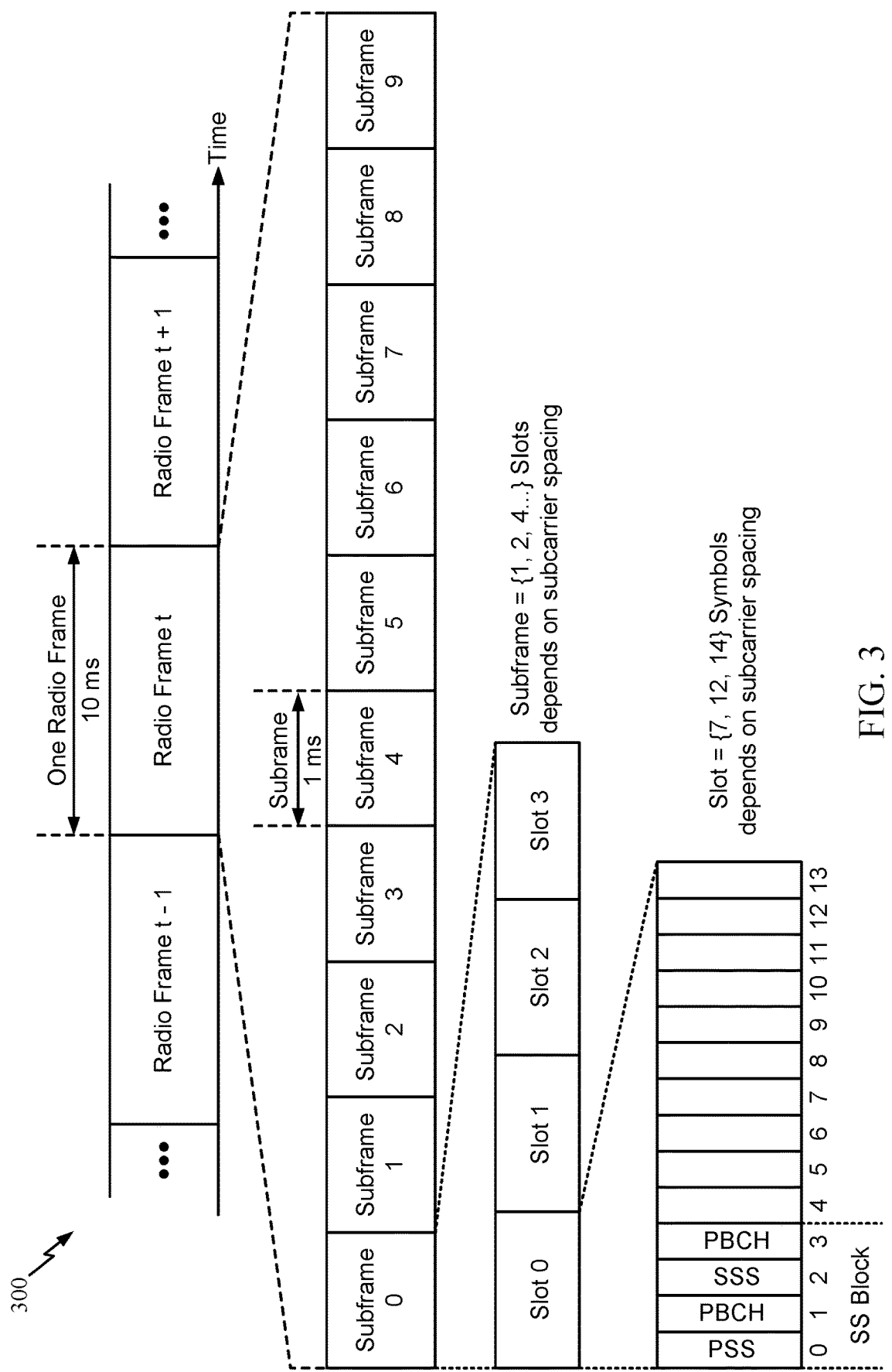
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

Figure 4:
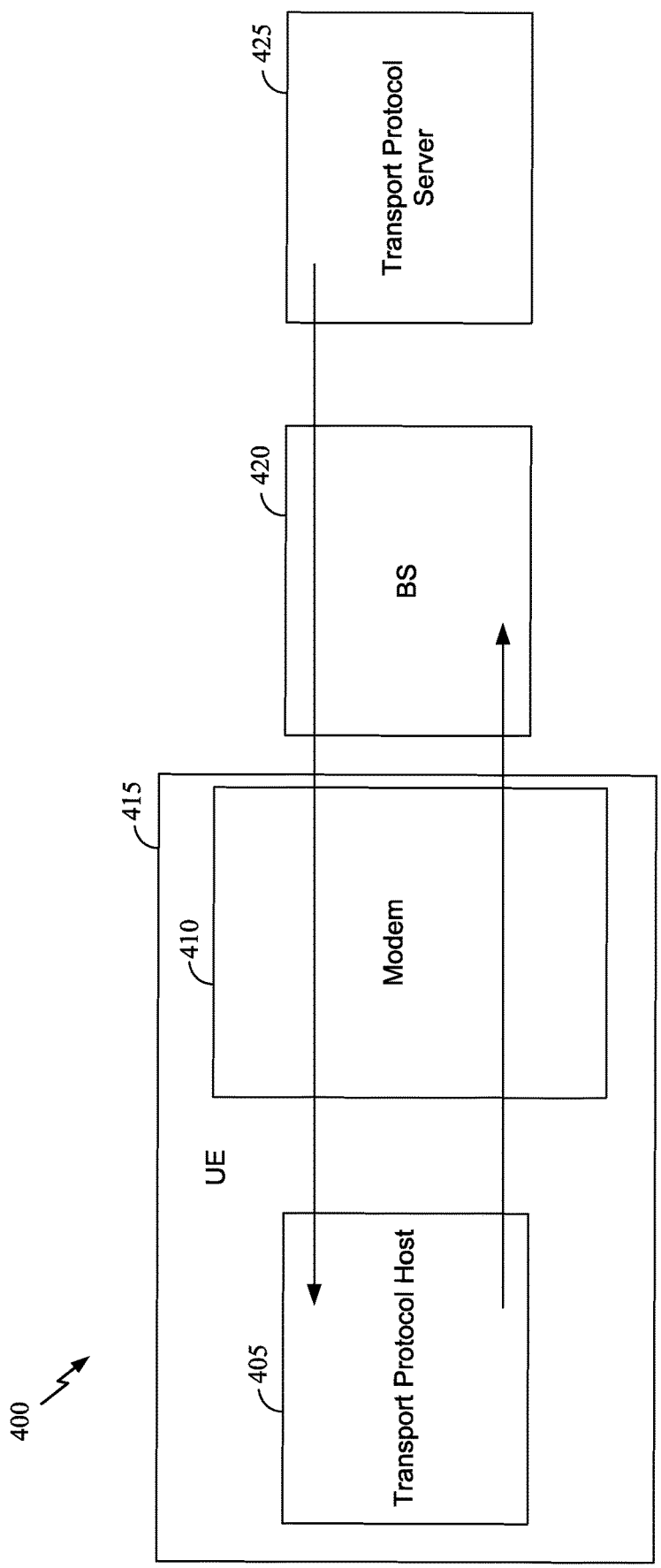
FIG. 4 is a block diagram conceptually illustrating a UE, a BS, and a server configured for a transport control protocol (TCP), in accordance with certain aspects of the present disclosure.

FIG. 4 illustrates a block diagram of a transport protocol system 200 including a UE 415 (e.g., such as the UE 120a illustrated in FIG. 1), a BS 420 (e.g., such as the BS 110a illustrated in FIG. 1), and a transport protocol server 425. As shown in FIG. 4, the UE 415 may include a transport protocol host 405 (e.g., a TCP stack at the UE 415). The transport protocol host 405 may control and convert signals transmitted and received by the UE 415 for a transport protocol. The UE 415 also includes a modem 410 (e.g., for signaling at a packet data convergence protocol layer). The BS 420 may provide a link between the UE 415 and the transport protocol server 425. The transport protocol host 405 and the transport protocol server 425 may be endpoints for the transport protocol.

In some examples, the transport protocol is a TCP. TCP is a protocol of an Internet protocol (IP) suite. TCP is sometimes referred to as TCP/IP. TCP may provide a stream of ordered and error-checked octets (bytes) between applications running on hosts communicating via a network. TCP may be bi-directional (e.g., both uplink and downlink). TCP may be used in multi-subscriber identity module (MSIM) scenarios, also referred to as concurrent radio access technology (RAT) where one hardware (e.g., one modem) is used for multiple subscriptions (e.g., for multiple operators) any may have to perform tune-away between subscriptions to search for pages or other mobility procedures. In some examples, TCP uses a sliding window flow control protocol, wherein in each TCP segment (e.g., packet), the receiving (e.g., the transport protocol host 405 on the downlink) specifies in an amount of additionally received data (in bytes) corresponding to the ACK sequence number, as well as additional data it is willing to buffer for the connection (e.g., in a receive window). The sending host (e.g., the transport protocol server 425) can send only up to that amount of data before it waits for an ACK and a window update from the receiving host.

Some TCP implementations include four phases of congestion control: slow-start, congestion avoidance, fast retransmit, and fast recovery. For congestion avoidance, ACKs for data sent and/or lack of ACKs, are used by senders to infer network conditions between the TCP sender and receiver. Coupled with timers, TCP senders and receivers can alter the behavior of the flow of data. Enhancing TCP to reliably handle loss, minimize errors, manage congestion and go fast in very high-speed environments are ongoing areas of research and standards development. As a result, there are a number of TCP congestion avoidance algorithm variations.

Throughput issues may arise when the instantaneous transport protocol ACKing rate on the UL or the DL is high. In some cases, modems (e.g., such as the modem 410) transmit transport protocol ACKs at a high rate, allowing a transport protocol sender (e.g., such as the transport protocol server 425) to issue a large amount of data (e.g., a spike or burst of packets), which in turn may create buffer overflow at a bottleneck (e.g., such as at the BS 420).

UL transport protocol ACK bursting (e.g., high ACK rate) may be caused by various scenarios. In an example, UL transport protocol ACK bursting may occur when the UE 415 (e.g., at the layer 2) prioritizes transmission of ACKs over other data. In this scenario, when an UL grant is delayed, the transport protocol ACK buffer builds and the UE 415 transmits all of the buffered ACKs at once—in a burst. In another example, UL transport protocol ACK bursting may occur in response to a downlink data burst. For example, when recovering a hole or holes (e.g., at the radio link control (RLC) the RLC protocol may deliver a large burst of data to the transport layer, leading to a burst of transport protocol ACKs from the host. In such a scenario, the issue may be exacerbated in MSIM scenarios where RLC recovery may be more frequent due to tune away from a serving cell. In another example, UL transport protocol ACK bursting may occur when the WLAN (wireless local area network) station, in the case of a mobile hotspot, incurs delay in accessing the WLAN medium. Once the WLAN station accesses the data, the WLAN station sends a burst of transport protocol ACKs to the UE 415, which in turn bursts it on WWAN. In yet another example, UL transport protocol ACK bursting may occur when a host scheduler schedules a task with some delay. Once the task runs, large amounts of transport protocol data is processed and corresponding UL transport protocol ACKs are created and transmitted. In yet another example, UL transport protocol ACK bursting may occur when delays are implemented in modem accumulation and/or aggregation timers.

The examples described above are merely illustrative of certain scenarios that may lead to UL transport protocol ACK bursting. The description is not intended to be limited to these examples; other scenarios can be lead to UL transport protocol ACK bursting and may be addressed by the techniques described herein, for UL transport protocol ACK shaping and/or DL data shaping, in more detail below. Because UL transport protocol ACK bursting can be caused by a variety of scenarios, it may not be simple/possible to eliminate all sources causing UL transport protocol ACK bursting.

On the DL, the UE 415 (e.g., at the L2) may accumulate large amounts of data due to reordering. The transfer speed between the modem (at the UE 415) and the host (at the UE 415) can vastly exceed that of the air interface between the UE 415 and the BS 420 and/or sending host, such as due to speed of double data rate (DDR))/direct memory access (DMA). This can create issues for the host (at the UE 415). For example, the host handles the data and delivers a large number of ACKs (issue of ACK bursting). The host may not be ready for this and can incur delay or packet loss when processing such large burst. The host CPU may become overloaded by the high rate of the burst.

In some aspects of the present disclosure, when the UE 415 experiences an error (e.g., a block error, when a block error rate (BLER) is greater than 0) in receiving a packet, then data received after the error may accumulate in a PDCP reordering window (ROW) while the UE 415 requests and waits for a retransmission of the packet. If the UE 415 successfully receives a retransmission of the packet, then the PDCP part of a receive protocol stack of the UE 415 delivers all of the accumulated packets to higher layers of the UE 415, and the higher layers may deliver ACKs for all of the accumulated packets for transmission from the UE 415. The transmit protocol stack transmits the ACKs in sequence, causing a delay in delivery of the ACKs for packets received after the packet which the UE 415 received in error.

ACK shaping may allow the UE 415 to control the rate or amount of UL transport protocol ACKs transmitted in a TTI (e.g., in an UL slot, such as a PUSCH slot) and/or the rate or amount of data units (transport protocol data only, or all data) transmitted to the host per unit of time.

There may be no single optimal UL transport protocol ACK rate for all scenarios. For example, a UE 415 may release (i.e., transmit) some minimum amount of ACKs in order to keep a BS 420 buffer replenished, that is, to maintain a level of throughput; however, the UE 415 may not know how much buffer the BS 420 has for the UE 415, or if the buffer is shared with other UEs. Also, the buffer occupancy may vary over time. Additionally, there may be no throughput increase by building a bigger buffer at the BS 420. When the UE 415 transmits less than the minimum amount of ACKs, the sending host may become window-limited. However, when the UE 415 transmits too many ACKs, the BS 420 buffer may overflow, and the sending host DL data rate may drop.

Figure 5:
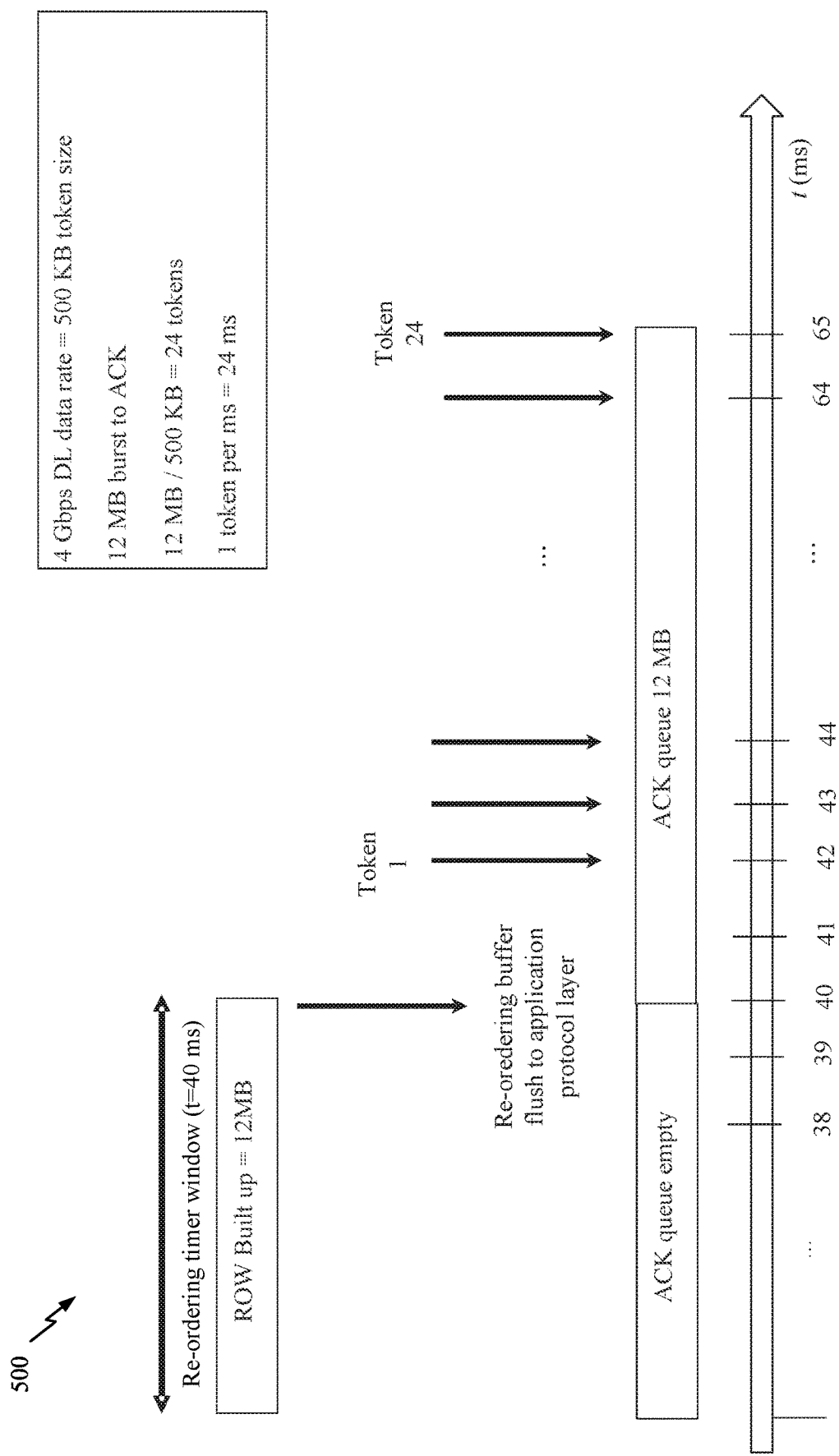
FIG. 5 is an example transmission timeline of a UE, in accordance with certain aspects of the present disclosure.

FIG. 5 is an example transmission timeline 500 of a UE (e.g., a UE 120a as shown in FIG. 1). In the example transmission timeline, the UE is configured with packet reordering timer ($T_{reordering}$) of 40 ms. That is, a layer 2 of a receive protocol stack of the UE can hold PDCP packets up to 40 ms before reporting an error to a higher protocol layer. The UE is also configured with a DL data rate of 4 Gbps and a token rate of 500 KB/ms. The UE may have an error receiving a packet, and a PDCP ROW build up is started, e.g., due to a BLER being greater than 0. After 40 ms, at the UE has a successful recovery of the error (e.g., the UE receives a retransmission of the packet with which the UE had the error), and 12 MB of data is pushed to an AP layer. All PDCP packets are released in-sequence to the AP TCP stack. The AP provides all the TCP ACK for DL 12 MB data in a few ms. With a current token bucket algorithm of 500 KB/ms, the UE uses 12 MB/500K=24 ms to send all of the ACKs. Already, the error in receiving the DL packets induced 40 ms delay in DL. Due to ACK shaping (e.g., transmitting ACKs for 500 KB/ms), an additional 24 ms delay is added overall.

Figure 6:
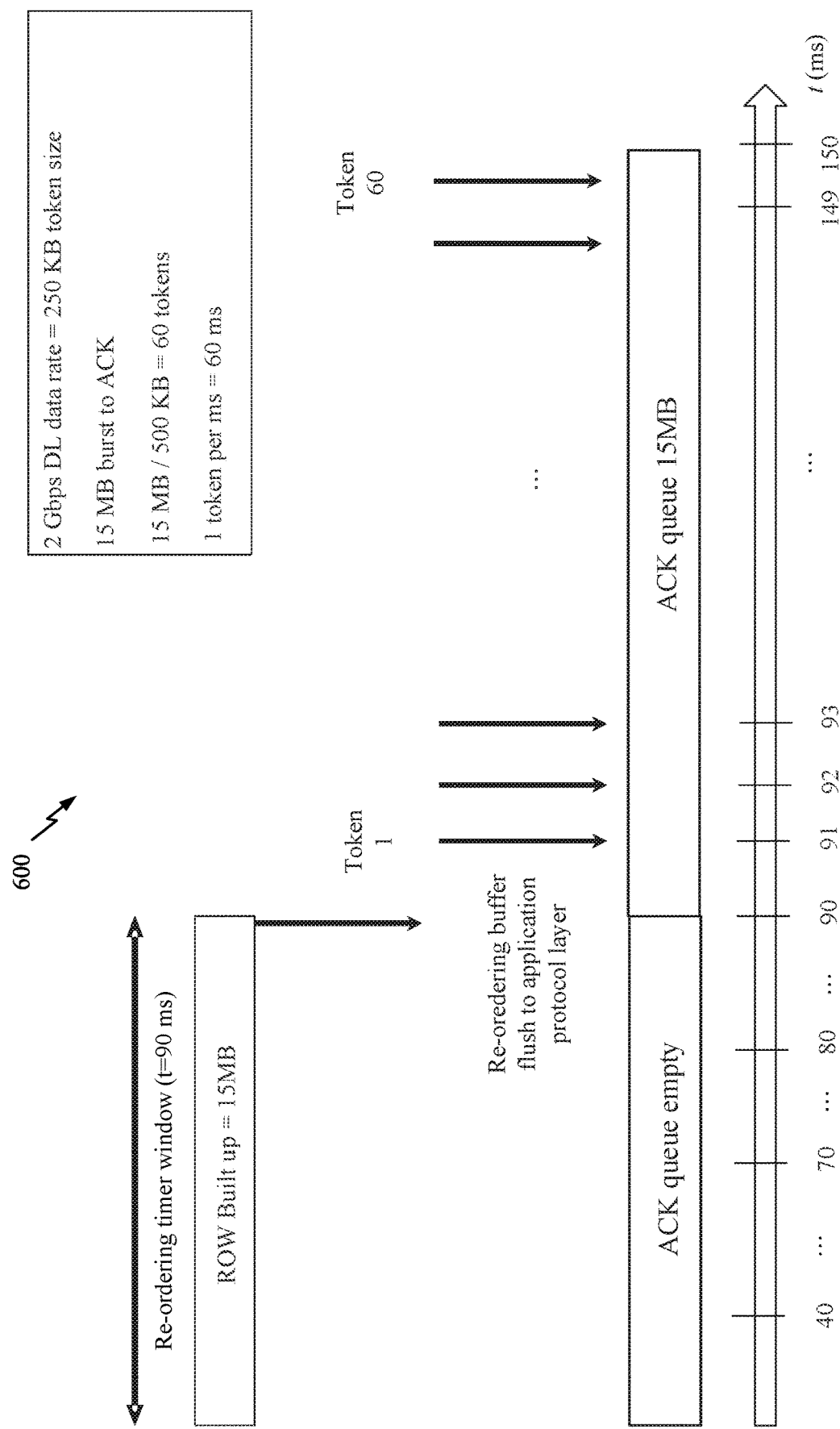
FIG. 6 is an example transmission timeline of a UE, in accordance with certain aspects of the present disclosure.

FIG. 6 is an example transmission timeline 600 of a UE (e.g., UE 120a, shown in FIG. 1). In the example transmission timeline, the UE is configured with a packet reordering timer ($T_{reordering}$) of 90 ms. The UE is also configured with a DL data rate of 2 Gbps and a token rate of 250 KB/ms. The UE may have an error receiving a packet, and a PDCP ROW build up is started, e.g., due to a BLER being greater than 0. After 90 ms, the UE has a successful recovery of the error (e.g., the UE receives a retransmission of the packet with which the UE had the error), and 15 MB of data is pushed to an AP layer. All PDCP packets are released in-sequence to the AP TCP stack. The AP provides all the TCP ACK for DL 15 MB data in a few ms. With a current token bucket algorithm of 250 KB/ms, the UE uses 15 MB/250K=60 ms to send all of the ACKs. Already, the error in receiving the DL packets induced 90 ms delay in DL. Due to ACK shaping (e.g., transmitting ACKs for 500 KB/ms), an additional 60 ms delay is added overall.

ACK shaping as described above may smooth a burst of ACKs on the UL to ensure smooth buffering at the network (e.g., at a BS receiving the ACKs), but DL inactivity and/or burstiness may cause a further increase in TCP round-trip time (RTT).

Figure 7:
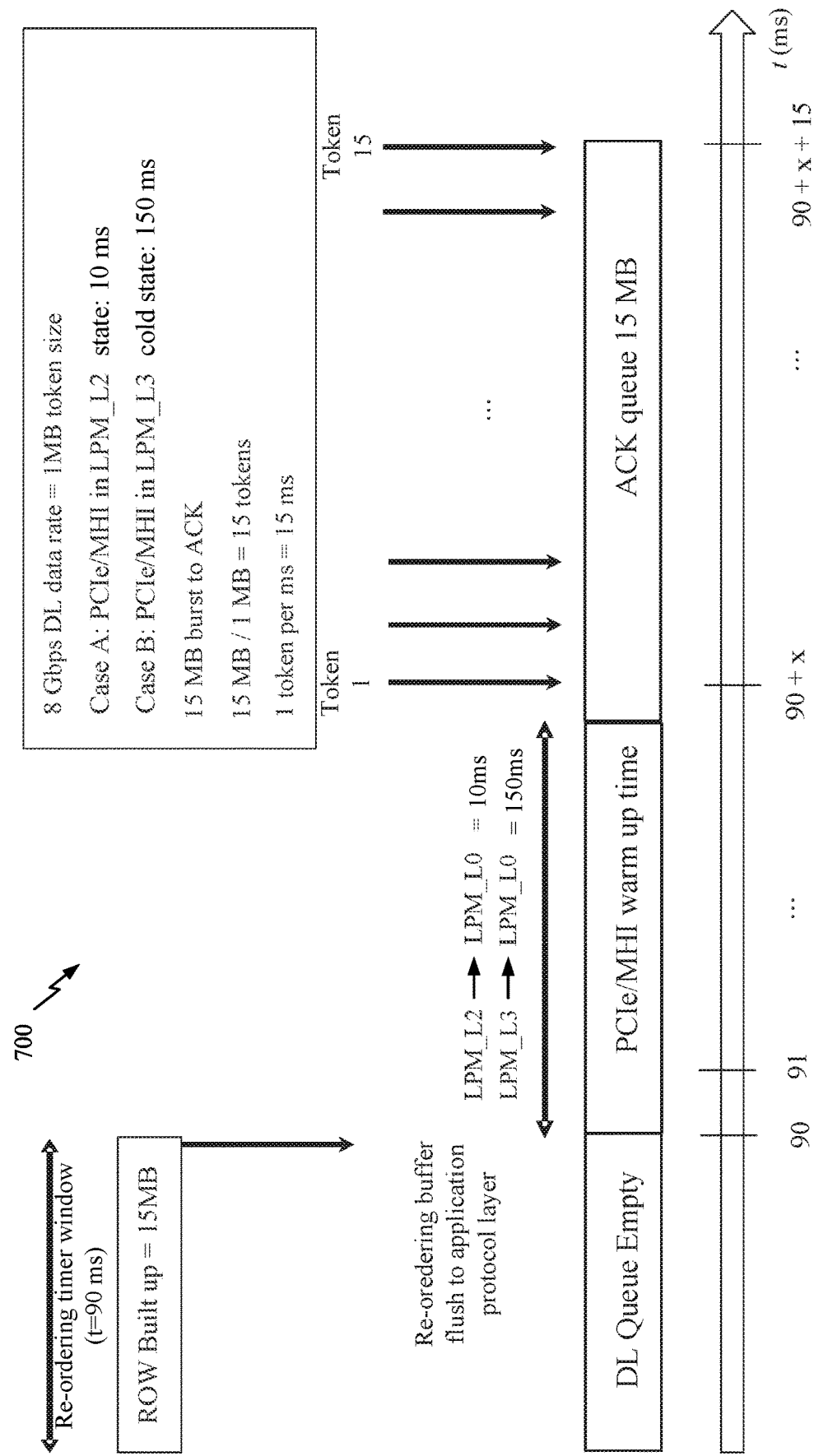
FIG. 7 is an example transmission timeline of a UE, in accordance with certain aspects of the present disclosure.

FIG. 7 is an example transmission timeline 700 of a UE (e.g., UE 120a, shown in FIG. 1). In the example transmission timeline, the UE is configured with a packet reordering timer ($T_{reordering}$) of 90 ms. The UE is also configured with a DL data rate of 2 Gbps and a token rate of 250 KB/ms. The UE may have an error receiving a packet, and a PDCP ROW build up is started, e.g., due to a BLER being greater than 0. After 90 ms, the UE has a successful recovery of the error (e.g., the UE receives a retransmission of the packet with which the UE had the error), and 15 MB of data is pushed to an AP layer. As there has been no active traffic with the ROW building up, various components (e.g., a peripheral component interconnect express (PCIe) link) of the UE (e.g., components in a wireless modem of the UE) might go into non-active state (e.g., LPM_L0 state, where LPM_L0 is a least active state of four states, LPM_L0, LPM_L1, LPM_L2, and LPM_L3 for a PCIe link) along with a modem host interface (MHI) driver. The PCIe link and MHI driver may have a warm up delay to return to an active state. The amount of delay may be based on the non-active and active state. For example, a warm up to the LPM_L0 for LPM_L2 may be 10 ms and warm up to the LPM_L0 state for LPM_L3 may be 150 ms. All PDCP packets are released in-sequence to the AP TCP stack. The AP provides all the TCP ACKs for DL 15 MB data in a few ms. In an example, the UE is capable of draining data at a rate of 8 Gbps, which is equivalent to 1 MB/ms, and thus it takes the UE 15 ms to send all of the ACKs.

Example Acknowledgment Shaping for Downlink Data Bursts

Aspects of the present disclosure provide techniques for user equipments (UEs) to shape acknowledgments (ACKs) in response to downlink (DL) data bursts. A UE may, after arrival of a DL data burst, send a first number of ACK tokens in a first transmission time interval (TTI) and then send one ACK token in later TTIs.

An ACK shaping algorithm may operate on a token based logic. In some systems, the ACK shaping algorithm may be executed to send 1 token per millisecond. The techniques described herein may allow "frontloading" where in a first TTI (e.g., first milliseconds), the ACK shaping algorithm may be configured to send multiple ACKs, and then additional ACKs may be sent in later TTIs (e.g., every further 1 milliseconds). The techniques described herein are dynamic, and the frontloading may send varying amounts of ACKs in a first few milliseconds. The techniques described herein may use dummy traffic to awaken a link and reduce warm up delay.

Figure 8:
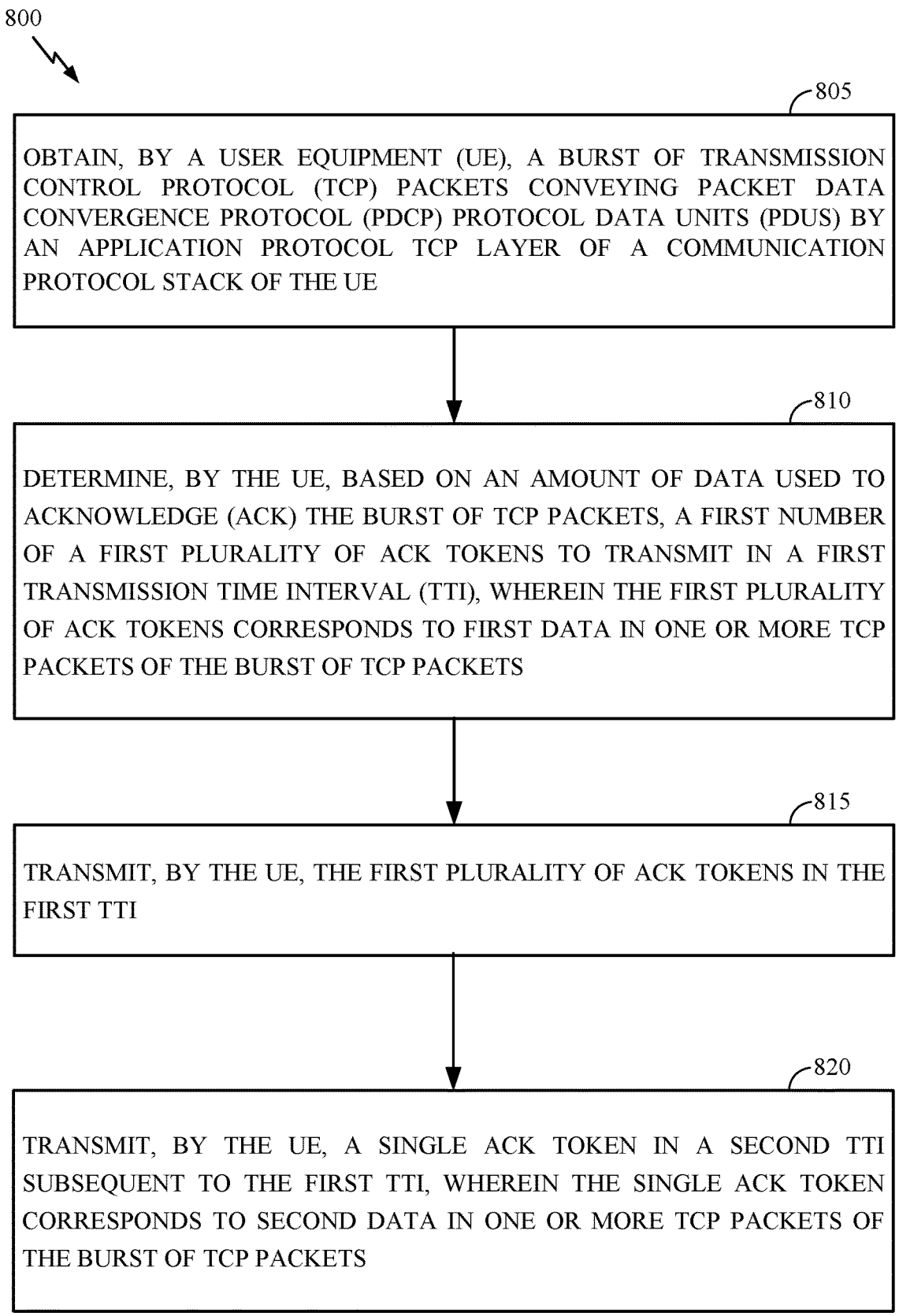
FIG. 8 is a flow diagram illustrating example operations for wireless communications by a UE, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a in the wireless communication network 100 of FIG. 1) during DL transmission. Operations 800 may be implemented as software components that are executed and run on one or more processors (e.g., a controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., the controller/processor 280 of FIG. 2) obtaining and/or outputting signals.

At 805, the UE obtains a burst of transmission control protocol (TCP) packets conveying packet data convergence protocol (PDCP) protocol data units (PDUs) by an application protocol TCP layer of a communication protocol stack of the UE.

At 810, the UE determines, based on an amount of data used to acknowledge (ACK) the burst of TCP packets, a first number of a first plurality of ACK tokens to transmit in a first transmission time interval (TTI). The first plurality of ACK tokens corresponds to first data in one or more TCP packets of the burst of TCP packets.

At 815, the UE transmits the first plurality of ACK tokens in the first TTI.

At 820, the UE transmits a single ACK token in a second TTI subsequent to the first TTI. The single ACK token corresponds to second data in one or more TCP packets of the burst of TCP packets.

In certain aspects, determining the first number of the first ACK tokens includes determining a minimum of a first threshold number of ACK tokens and a quotient of one-half of the amount of data divided by a size of each ACK token. In some such aspects, the threshold is ten. In some other such aspects, the UE performing operations 800 receives a configuration indicating the first threshold number of ACK tokens.

In certain aspects, determining a second number of a second plurality of ACK tokens includes a quotient of a remainder of the amount of data used to ACK the burst of TCP packets divided by a size of each ACK token. The second plurality of ACK tokens corresponds to third data in a one or more TCP packets of the burst of TCP packets. A single ACK token of the second plurality of ACK tokens in transmitted in each TTI, subsequent the second TTI.

In certain aspects, determining the first number of the first plurality of ACK tokens is further based on an average time spent in a DL PDCP ROW by the TCP packets in the burst of TCP packets.

In certain aspects, the UE performing operations 800 determines, based on the amount of data used to acknowledge the TCP packets, a third number of a third plurality of ACK tokens to transmit in a third TTI. The third TTI is subsequent to the first TTI and before the second TTI. Each of the third plurality of ACK tokens corresponds to fourth data in one or more TCP packets of the burst of TCP packets. The UE transmits the third plurality of ACK tokens in the third TTI. In some such aspects, determining the third number of the third plurality of ACK tokens includes determining a minimum of a second threshold number of ACK tokens, wherein the second threshold number is different than the first threshold number and a quotient of one-half a remainder of the amount of data divided by a size of each ACK token. In some other such aspects, the threshold is five.

In certain aspects, the burst of TCP packets includes packets flushed from a re-ordering buffer within a threshold period.

In certain aspects, the UE performing operations 800, before obtaining the burst of TCP packets, sends dummy traffic from the application protocol TCP layer to an application processor in response to a determination that at least one of: an amount of data in a reordering buffer is above a threshold quantity of data, no downlink traffic has been received within a threshold duration, a reordering timer will expire within a threshold duration, an accumulation timer will expire within a threshold duration, or a combination thereof. In some such aspects, the dummy traffic includes a flow control command. In some other such aspects, the dummy traffic includes a DL burst marker.

In aspects of the present disclosure, a UE receiving packets may experience a PDCP reordering window build up due to an error in receiving a packet. After a successful recovery of the error, a burst of DL packets may be pushed to an application protocol layer. Whenever there is a flush or burst of DL data, an ACK shaping algorithm as described herein will acquire a non-zero number of tokens to start transmitting. The number of tokens to transmit in a first TTI may depend on how much data is flushed or the size of/burst in a DL. For example, 12 MB is flushed to the AP of the UE, and the UE has tokens worth 6 MB to start. In the example, a maximum number of tokens the UE may transmit in a TTI is 10. The UE may determine to transmit a number of tokens=MIN (10, Half_Burst/Token_Size). Then, after the first 6 MB worth of ACKs are transmitted at a first opportunity, every millisecond one token is acquired to send an ACK in an uplink (UL) for 500 KB worth of data.

Figure 9:
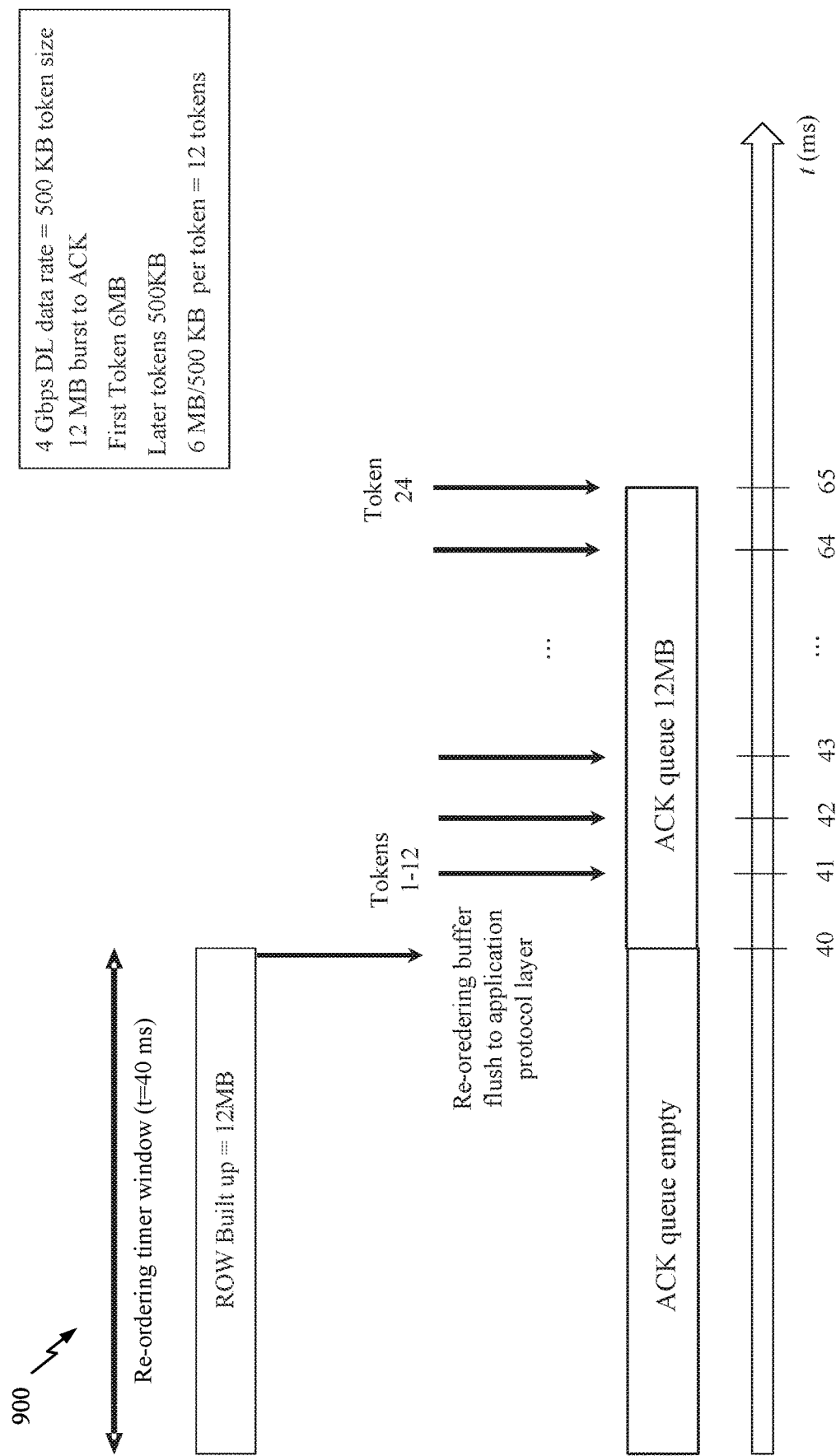
FIG. 9 is an example transmission timeline of a UE, in accordance with certain aspects of the present disclosure.

FIG. 9 is an example transmission timeline 900 of a UE (e.g., the UE 120a as shown in FIG. 1) showing an example of ACK shaping with frontloading, in accordance with aspects of the present disclosure. In the example transmission timeline 900, the UE is configured with a packet reordering timer ($T_{reordering}$) of 40 ms. That is, a layer 2 of a receive protocol stack of the UE can hold PDCP packets up to 40 ms before reporting an error to a higher protocol layer. The UE is also configured with a DL data rate of 4 Gbps and a token rate of 500 KB/ms. The UE may have an error receiving a packet, and a PDCP ROW build up started, e.g., due to a block error rate (BLER) being greater than 0. After 40 ms, the UE has a successful recovery of the error (e.g., the UE receives a retransmission of the packet with which the UE had the error), and 12 MB of data is pushed to an AP layer. All PDCP packets are released in-sequence to the AP TCP stack. The AP provides all the TCP ACKs for DL 12 MB data in a few ms. As shown in FIG. 9, the UE can "frontload" some of the ACK tokens. As shown in the illustrative example, the UE sends ACKs corresponding to 6 MB of data (e.g., token 1-12) in a first TTI (e.g., in a first millisecond). The UE can send the remaining ACK tokens each ms. As shown, the UE can send the 12 tokens for the remaining 6 MB of data over the next 12 ms. Thus, the ACK shaping with frontloading shown in FIG. 9 for 12 MB of data, may reduce the time for sending the ACKs to 13 ms instead of the 24 ms used for the sending the ACKs in the example shown in FIG. 5.

Figure 10:
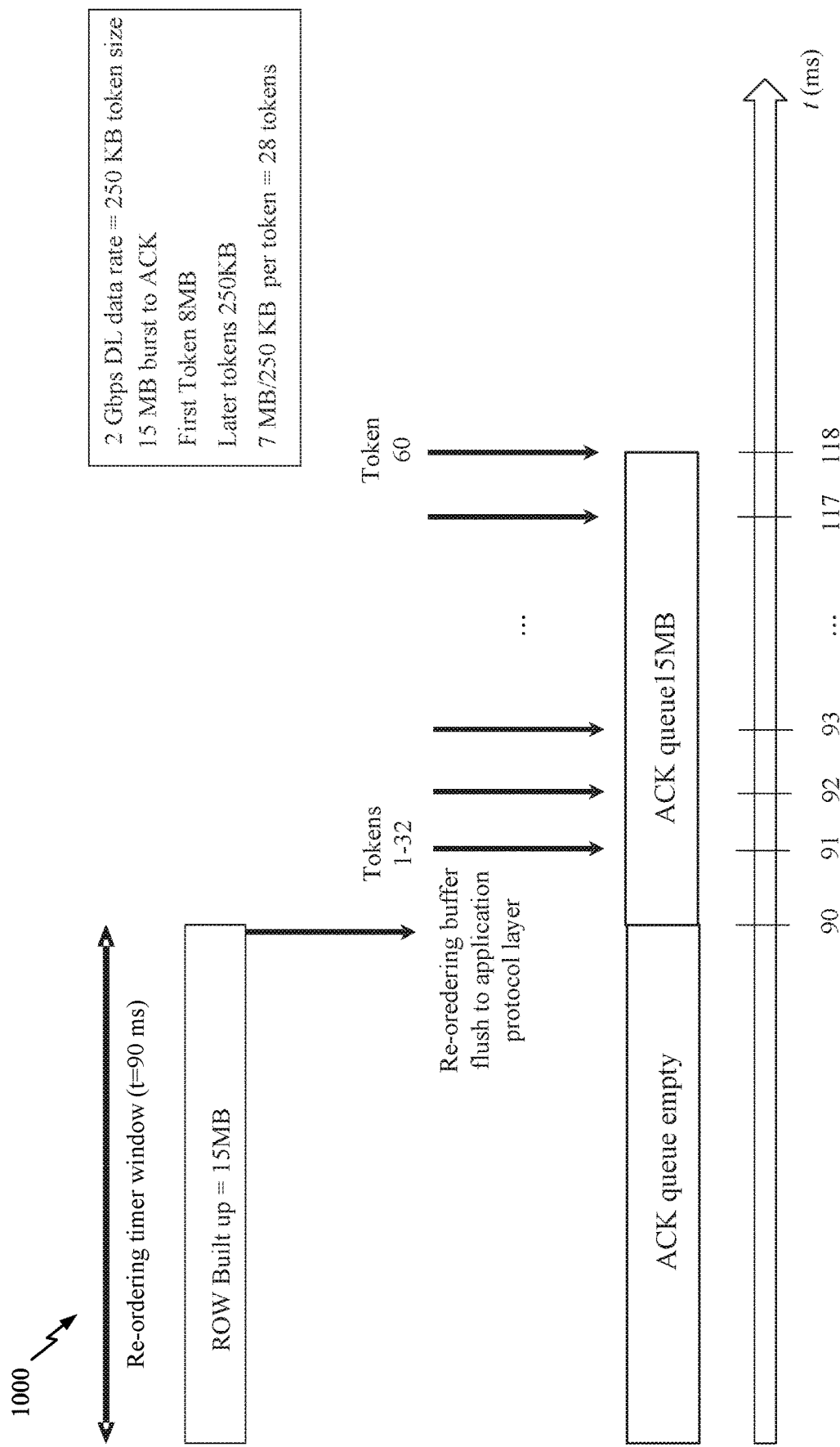
FIG. 10 is an example transmission timeline of a UE, in accordance with certain aspects of the present disclosure.

FIG. 10 is an example transmission timeline 1000 of a UE (e.g., the UE 120a as shown in FIG. 1) showing another example of ACK shaping with frontloading, in accordance with aspects of the present disclosure. In the example transmission timeline 1000, the UE is configured with a packet reordering timer ($T_{reordering}$) of 90 ms; a DL data rate of 2 Gbps; and a token rate of 250 KB/ms. After 90 ms, 15 MB of data is pushed to an AP layer. In the example in FIG. 10, the UE frontloads ACKs corresponding to 8 MB of data in a first TTI (e.g., Tokens 1-32). The UE can send ACKs for the remaining 7 MBs of data over the next 28 ms (e.g., Tokens 33-60). Thus, the ACK shaping with frontloading shown in FIG. 10 for 15 MB of data, may reduce the time for sending the ACKs to 29 ms instead of the 60 ms used for the sending the ACKs in the example shown in FIG. 6.

Figure 11:
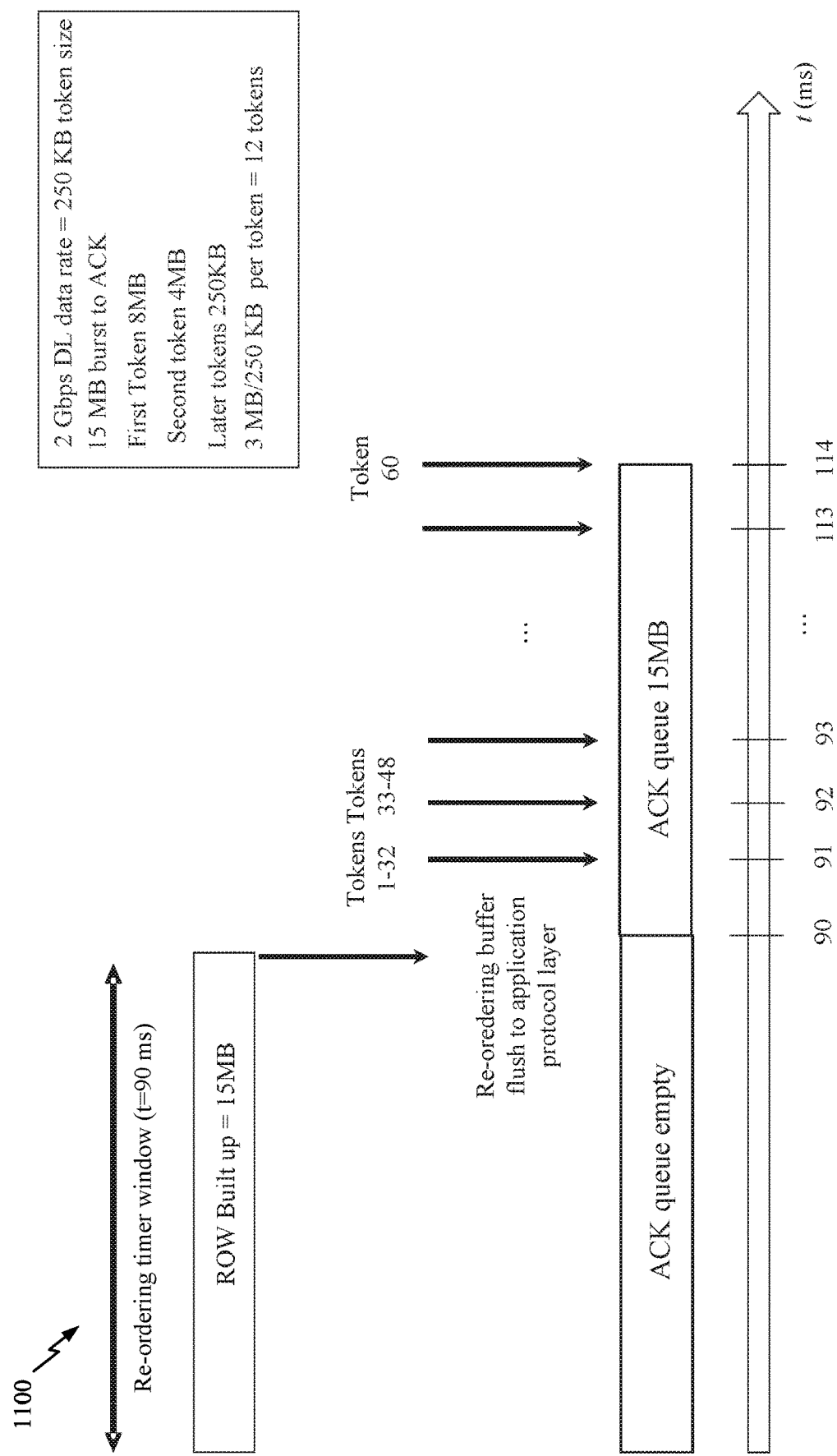
FIG. 11 is an example transmission timeline of a UE, in accordance with certain aspects of the present disclosure.

FIG. 11 is an example transmission timeline 1100 of a UE (e.g., UE 120a, shown in FIG. 1) showing ACK shaping with dynamic frontloading, in accordance with aspects of the present disclosure. In the example transmission timeline 1100, the UE is configured with a packet reordering timer ($T_{reordering}$) of 90 ms; a DL data rate of 2 Gbps; and a token rate of 250 KB/ms. After 90 ms, 15 MB of data is pushed to an AP layer. As shown, the UE sends ACKs corresponding to 8 MB of data in a first TTI (e.g., ACK tokens 1-32). The UE then sends ACKs corresponding to 4 MB of data in a second TTI (e.g., tokens 33-48). The UE can send ACKs for the remaining 3 MBs of data over the next 12 ms (e.g., Tokens 49-60). Thus, the ACK shaping with dynamic frontloading shown in FIG. 11 for 15 MB of data, may further reduce the time for sending the ACKs to 15 ms instead of the 29 ms used for the sending the ACKs in the example shown in FIG. 10.

In aspects of the present disclosure, ACK shaping as described above may smooth a burst of ACKs on an UL to ensure smooth buffering at a network (e.g., at a base station (BS) receiving the ACKs), but DL inactivity and/or burstiness may cause a further increase in TCP round-trip time (RTT). Aspects of the present disclose provide for the UE to determine the amount/rate of UL transport protocol ACKs to transmit in a duration.

Figure 12:
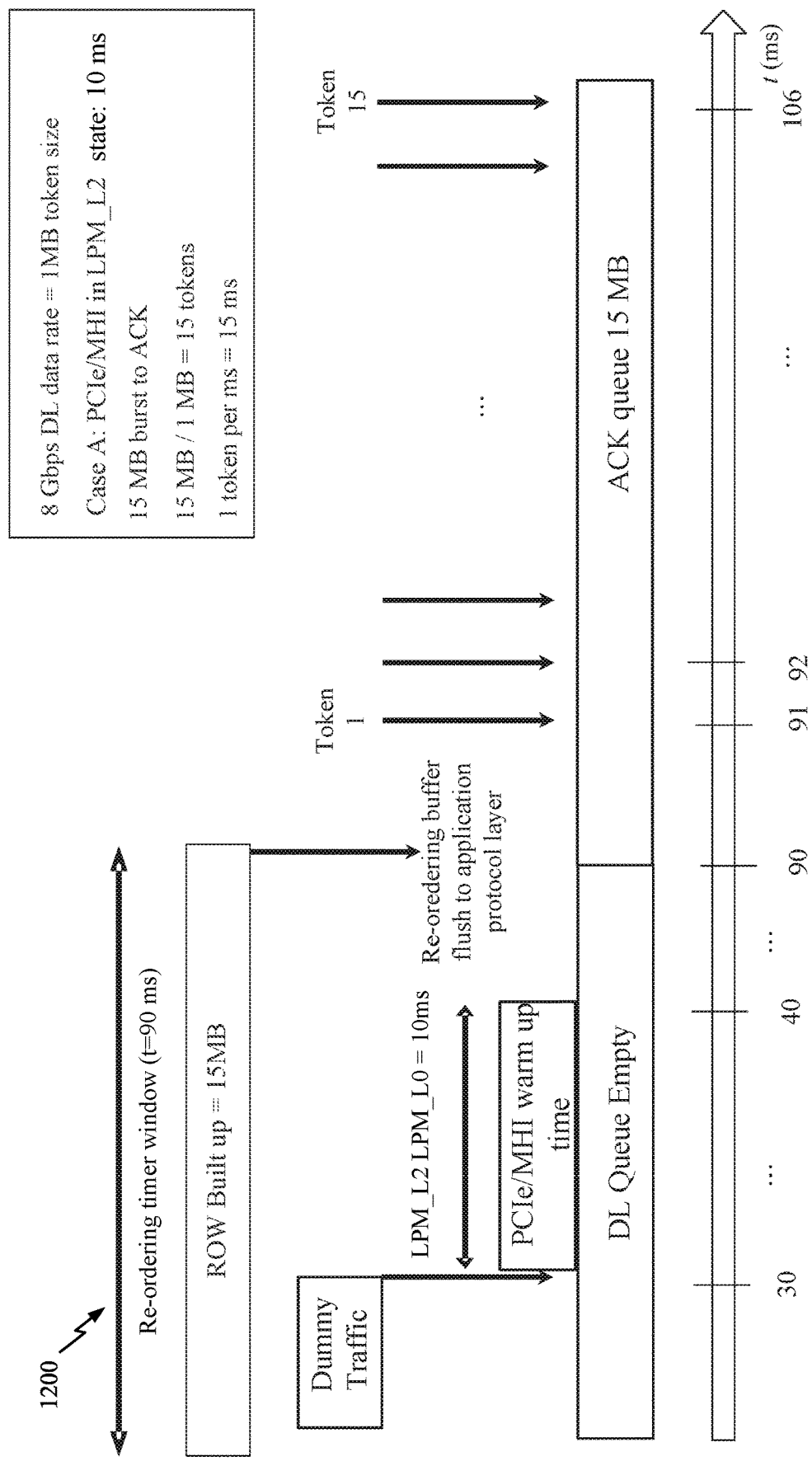
FIG. 12 is an example transmission timeline of a UE, in accordance with certain aspects of the present disclosure.

According to certain aspects, dummy packets may be used to prevent components from entering an inactive state, thereby avoiding warm up delays. FIG. 12 is an example transmission timeline 1200 of a UE (e.g., the UE 120a as shown in FIG. 1), in accordance with aspects of the present disclosure. In the example transmission timeline 1200, the UE is configured with a packet reordering timer ($T_{reordering}$) of 90 ms; a data rate of 8 Gbps; and a token rate of 1 MB. During the reordering window, the UE may generate and send dummy traffic from a TCP layer to a processor to cause a peripheral component interconnect express (PCIe) and/or a modem host interface (MHI) to become active, or to keep active. As shown, the dummy traffic may wake up PCIe and/or MHI components from a lower power mode (LPM) to an active state, such as LPM_2 to LPM_0. In the example, it may take 10 ms for the wake up. Since the dummy traffic began more than 10 ms before flush of the re-ordering buffer, the wake up may cause no additional delay in the sending of the ACKs. Thus, after 90 ms, 15 MB of data is pushed to an AP layer and because the PCIe and the MHI became active in response to the dummy traffic, the UE can begin transmitting ACKs. In the example, the UE is capable of draining data at a rate of 8 Gbps, or 1 MB/ms. Thus, the UE can send all of the ACKs in 15 ms, as opposed to the 25 ms that would be used in the example illustrated in FIG. 7.

Figure 13:
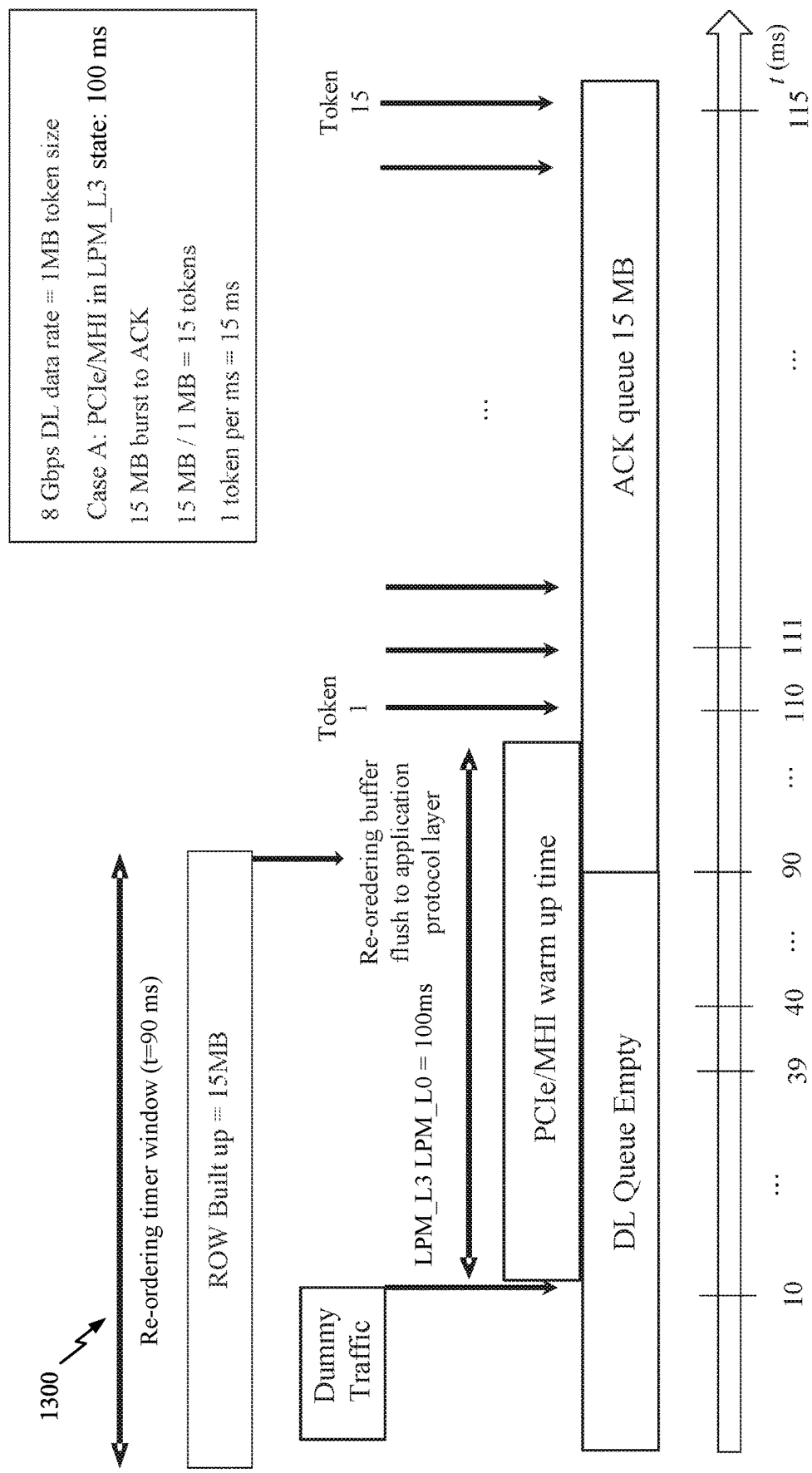
FIG. 13 is an example transmission timeline of a UE, in accordance with certain aspects of the present disclosure.

In some cases, using the dummy traffic to activate the components may reduce, but not eliminate the delay, as shown in FIG. 13. For example, the warm up for the L3 state may be 100 ms, and may still be warming up when the re-ordering buffer is flushed. In the illustrative example shown, the PCIe/MHI warm up for an additional 20 ms delay, after which the UE can begin transmitting the ACKs. Thus, the UE can send all of the ACKs in 35 ms, as opposed to the 115 ms that would be used in the example illustrated in FIG. 7.

Figure 14:
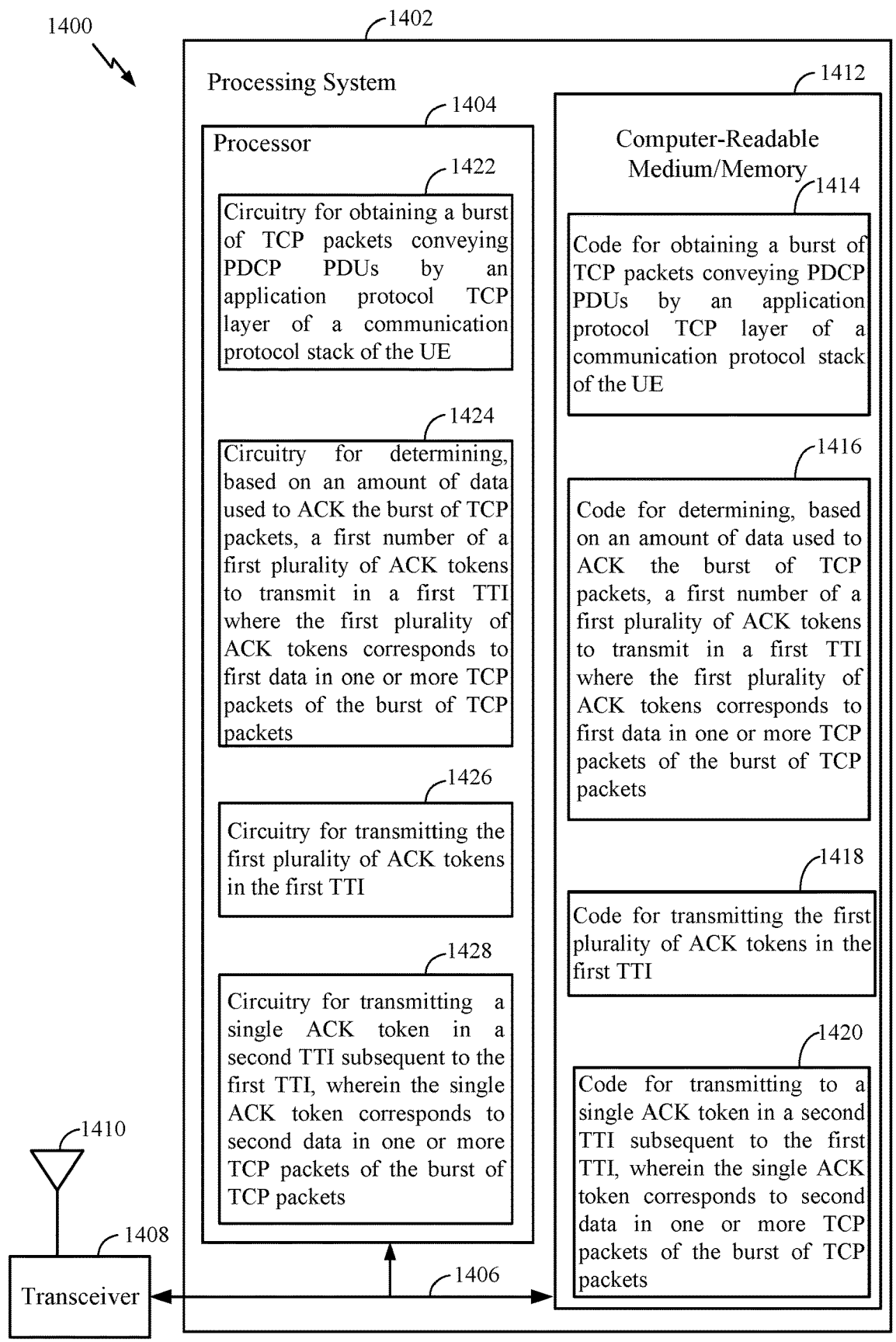
FIG. 14 illustrates a communications device that may include various components configured to perform operations for the techniques disclosed herein in accordance with certain aspects of the present disclosure.

FIG. 14 illustrates a communications device 1400 that may include various components (e.g., corresponding to means-plus-function components) configured to perform operations for the techniques disclosed herein, such as the operations illustrated in FIG. 8. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8, or other operations for performing the various techniques discussed herein for UL ACK shaping. In certain aspects, computer-readable medium/memory 1412 stores code 1414 for obtaining a burst of TCP packets conveying PDCP PDUs by an application protocol TCP layer of a communication protocol stack of the UE; code 1416 for determining, based on an amount of data used to ACK the burst of TCP packets, a first number of a first plurality of ACK tokens to transmit in a first TTI where the first plurality of ACK tokens corresponds to first data in one or more TCP packets of the burst of TCP packets; code 1418 for transmitting the first plurality of ACK tokens in the first TTI; and code 1420 for transmitting a single ACK token in a second TTI subsequent to the first TTI where the single ACK token corresponds to second data in one or more TCP packets of the burst of TCP packets.

In certain aspects, the processor 1404 has circuitry configured to implement the code stored in the computer-readable medium/memory 1412. The processor 1404 includes circuitry 1422 for obtaining a burst of TCP packets conveying PDCP PDUs by an application protocol TCP layer of a communication protocol stack of the UE; circuitry 1424 for determining, based on an amount of data used to ACK the burst of TCP packets, a first number of a first plurality of ACK tokens to transmit in a first TTI where the first plurality of ACK tokens corresponds to first data in one or more TCP packets of the burst of TCP packet; circuitry 1426 for transmitting the first plurality of ACK tokens in the first TTI; and circuitry 1428 for transmitting a single ACK token in a second TTI subsequent to the first TTI where the single ACK token corresponds to second data in one or more TCP packets of the burst of TCP packets.

Example Aspects

Implementation examples are described in the following numbered aspects.

In a first aspect, a method for wireless communication by a user equipment (UE), comprising: obtaining a burst of transmission control protocol (TCP) packets conveying packet data convergence protocol (PDCP) protocol data units (PDUs) by an application protocol TCP layer of a communication protocol stack of the UE; determining, based on an amount of data used to acknowledge (ACK) the burst of TCP packets, a first number of a first plurality of ACK tokens to transmit in a first transmission time interval (TTI), wherein the first plurality of ACK tokens corresponds to first data in one or more TCP packets of the burst of TCP packets; transmitting the first plurality of ACK tokens in the first TTI; and transmitting a single ACK token in a second TTI subsequent to the first TTI, wherein the single ACK token corresponds to second data in one or more TCP packets of the burst of TCP packets.

In a second aspect, alone or in combination with the first aspect, determining the first number of first ACK tokens comprises: determining a minimum of: a first threshold number of ACK tokens; and a quotient of one-half of the amount of data divided by a size of each ACK token.

In a third aspect, alone or in combination with one or more of the first and second aspects, receiving a configuration indicating the first threshold number of ACK tokens.

In a fourth aspect, alone or in combination with one or more of the first through third aspects, determining a second number of a second plurality of ACK tokens comprising a quotient of a remainder of the amount of data used to ACK the burst of TCP packets divided by a size of each ACK token, wherein the second plurality of ACK tokens corresponds to third data in a one or more TCP packets of the burst of TCP packets; and transmitting a single ACK token of the second plurality of ACK tokens in each TTI, subsequent the second TTI.

In a fifth aspect, alone or in combination with one or more of the first through fourth aspects, determining the first number of the first plurality of ACK tokens is further based on an average time spent in a downlink PDCP reordering window by the TCP packets in the burst of TCP packets.

In a sixth aspect, alone or in combination with one or more of the first through fifth aspects, determining, based on the amount of data used to acknowledge the TCP packets, a third number of a third plurality of ACK tokens to transmit in a third TTI, wherein the third TTI is subsequent to the first TTI and before the second TTI, and wherein the third plurality of ACK tokens corresponds to fourth data in one or more TCP packets of the burst of TCP packets; and transmitting the third plurality of ACK tokens in the third TTI.

In a seventh aspect, alone or in combination with one or more of the first through sixth aspects, determining the third number of the third plurality of ACK tokens comprises: determining a minimum of: a second threshold number of ACK tokens, wherein the second threshold number is different than the first threshold number; and a quotient of one-half a remainder of the amount of data divided by a size of each ACK token.

In an eighth aspect, alone or in combination with one or more of the first through seventh aspects, the burst of TCP packets comprises packets flushed from a re-ordering buffer within a threshold period.

In a ninth aspect, alone or in combination with one or more of the first through eighth aspects, before obtaining the burst of TCP packets, sending dummy traffic from the application protocol TCP layer to an application processor in response to a determination that at least one of: an amount of data in a reordering buffer is above a threshold quantity of data, no downlink traffic has been received within a threshold duration, a reordering timer will expire within a threshold duration, an accumulation timer will expire within a threshold duration, or a combination thereof.

In a tenth aspect, alone or in combination with one or more of the first through ninth aspects, the dummy traffic comprises a flow control command.

In an eleventh aspect, alone or in combination with one or more of the first through tenth aspects, the dummy traffic comprises a downlink burst marker.

An apparatus for wireless communication, comprising at least one processor; and a memory coupled to the at least one processor, the memory comprising code executable by the at least one processor to cause the apparatus to perform the method of any of the first through eleventh aspects.

An apparatus comprising means for performing the method of any of the first through eleventh aspects.

A computer readable medium storing computer executable code thereon for wireless communications that, when executed by at least one processor, cause an apparatus to perform the method of any of the first through eleventh aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), WLAN, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
obtaining a burst of transmission control protocol (TCP) packets conveying packet data convergence protocol (PDCP) protocol data units (PDUs) by an application protocol TCP layer of a communication protocol stack of the UE;
determining, based on an amount of data used to acknowledge (ACK) the burst of TCP packets, a first number of a first plurality of ACK tokens to transmit in a first transmission time interval (TTI), wherein the first plurality of ACK tokens corresponds to first data in one or more TCP packets of the burst of TCP packets, and wherein a maximum number of ACK tokens that can be transmitted in the first TTI is equal to a first threshold number of ACK tokens, wherein determining the first number of the first plurality of ACK tokens comprises determining a minimum of:
the first threshold number of ACK tokens, and
a quotient of one-half of the amount of data divided by a size of each ACK token;
transmitting the first plurality of ACK tokens in the first TTI; and
transmitting a single ACK token in a second TTI subsequent to the first TTI, wherein the single ACK token corresponds to second data in one or more TCP packets of the burst of TCP packets.

2. The method of claim 1, further comprising:
receiving a configuration indicating the first threshold number of ACK tokens.

3. The method of claim 1, further comprising:
determining a second number of a second plurality of ACK tokens comprising a quotient of a remainder of the amount of data used to ACK the burst of TCP packets divided by a size of each ACK token, wherein the second plurality of ACK tokens corresponds to third data in a one or more TCP packets of the burst of TCP packets; and
transmitting a single ACK token of the second plurality of ACK tokens in each TTI, subsequent the second TTI.

4. The method of claim 1, wherein determining the first number of the first plurality of ACK tokens is further based on an average time spent in a downlink PDCP reordering window by the TCP packets in the burst of TCP packets.

5. The method of claim 1, further comprising:
determining, based on the amount of data used to acknowledge the TCP packets, a third number of a third plurality of ACK tokens to transmit in a third TTI, wherein the third TTI is subsequent to the first TTI and before the second TTI, and wherein the third plurality of ACK tokens corresponds to fourth data in one or more TCP packets of the burst of TCP packets; and
transmitting the third plurality of ACK tokens in the third TTI.

6. The method of claim 5, wherein determining the third number of the third plurality of ACK tokens comprises:
determining a minimum of:
a second threshold number of ACK tokens, wherein the second threshold number is different than the first threshold number; and
a quotient of one-half a remainder of the amount of data divided by a size of each ACK token.

7. The method of claim 1, wherein the burst of TCP packets comprises packets flushed from a re-ordering buffer within a threshold period.

8. The method of claim 1, further comprising:
before obtaining the burst of TCP packets, sending dummy traffic from the application protocol TCP layer to an application processor in response to a determination that at least one of: an amount of data in a reordering buffer is above a threshold quantity of data, no downlink traffic has been received within a threshold duration, a reordering timer will expire within a threshold duration, an accumulation timer will expire within a threshold duration, or a combination thereof.

9. The method of claim 8, wherein the dummy traffic comprises a flow control command.

10. The method of claim 8, wherein the dummy traffic comprises a downlink burst marker.

11. An apparatus for managing downlink data transmissions, comprising:
a memory; and
at least one processor coupled with the memory and configured to:

obtain a burst of transmission control protocol (TCP) packets conveying packet data convergence protocol (PDCP) protocol data units (PDUs) by an application protocol TCP layer of a communication protocol stack of the apparatus;

determine, based on an amount of data used to acknowledge (ACK) the burst of TCP packets, a first number of a first plurality of ACK tokens to transmit in a first transmission time interval (TTI), wherein the first plurality of ACK tokens corresponds to first data in one or more TCP packets of the burst of TCP packets, and wherein a maximum number of ACK tokens that can be transmitted in the first TTI is equal to a first threshold number of ACK tokens, and wherein, to determine the first number of the first plurality of ACK tokens, the at least one processor is configured to determine a minimum of:

the first threshold number of ACK tokens, and a quotient of one-half of the amount of data divided by a size of each ACK token;

transmit the first plurality of ACK tokens in the first TTI; and transmit a single ACK token in a second TTI subsequent to the first TTI, wherein the single ACK token corresponds to second data in one or more TCP packets of the burst of TCP packets.

12. The apparatus of claim 11, wherein the at least one processor is configured to:

receive a configuration indicating the first threshold number of ACK tokens.

13. The apparatus of claim 11, wherein the at least one processor is configured to:

determine a second number of a second plurality of ACK tokens comprising a quotient of a remainder of the amount of data used to ACK the burst of TCP packets divided by a size of each ACK token, wherein the second plurality of ACK tokens corresponds to third data in a one or more TCP packets of the burst of TCP packets; and transmit a single ACK token of the second plurality of ACK tokens in each TTI, subsequent the second TTI.

14. The apparatus of claim 11, wherein the first number of the first plurality of ACK tokens are determined based on an average time spent in a downlink PDCP reordering window by the TCP packets in the burst of TCP packets.

15. The apparatus of claim 11, wherein the at least one processor is configured to:

determine, based on the amount of data used to acknowledge the TCP packets, a third number of a third plurality of ACK tokens to transmit in a third TTI, wherein the third TTI is subsequent to the first TTI and before the second TTI, and wherein the third plurality of ACK tokens corresponds to fourth data in one or more TCP packets of the burst of TCP packets; and transmit the third plurality of ACK tokens in the third TTI.

16. The apparatus of claim 15, wherein the third number of the third plurality of ACK tokens are determined based on:

determining a minimum of:

a second threshold number of ACK tokens, wherein the second threshold number is different than the first threshold number; and a quotient of one-half a remainder of the amount of data divided by a size of each ACK token.

17. The apparatus of claim 11, wherein the burst of TCP packets comprises packets flushed from a re-ordering buffer within a threshold period.

18. The apparatus of claim 11, wherein the at least one processor is configured to:

before obtaining the burst of TCP packets, send dummy traffic from the application protocol TCP layer to an application processor in response to a determination that at least one of: an amount of data in a reordering buffer is above a threshold quantity of data, no downlink traffic has been received within a threshold duration, a reordering timer will expire within a threshold duration, an accumulation timer will expire within a threshold duration, or a combination thereof.

19. The apparatus of claim 18, wherein the dummy traffic comprises a flow control command.

20. The apparatus of claim 18, wherein the dummy traffic comprises a downlink burst marker.

21. An apparatus for managing downlink data transmissions, comprising:

means for obtaining a burst of transmission control protocol (TCP) packets conveying packet data convergence protocol (PDCP) protocol data units (PDUs) by an application protocol TCP layer of a communication protocol stack of the UE;

means for determining, based on an amount of data used to acknowledge (ACK) the burst of TCP packets, a first number of a first plurality of ACK tokens to transmit in a first transmission time interval (TTI), wherein the first plurality of ACK tokens corresponds to first data in one or more TCP packets of the burst of TCP packets, and wherein a maximum number of ACK tokens that can be transmitted in the first TTI is equal to a first threshold number of ACK tokens, wherein the means for determining the first number of the first plurality of ACK tokens comprises means for determining a minimum of:

the first threshold number of ACK tokens, and a quotient of one-half of the amount of data divided by a size of each ACK token;

means for transmitting the first plurality of ACK tokens in the first TTI; and means for transmitting a single ACK token in a second TTI subsequent to the first TTI, wherein the single ACK token corresponds to second data in one or more TCP packets of the burst of TCP packets.

22. The apparatus of claim 21, further comprising:

means for receiving a configuration indicating the first threshold number of ACK tokens.

23. The apparatus of claim 21, further comprising:

means for determining a second number of a second plurality of ACK tokens comprising a quotient of a remainder of the amount of data used to ACK the burst of TCP packets divided by a size of each ACK token, wherein the second plurality of ACK tokens corresponds to third data in a one or more TCP packets of the burst of TCP packets; and means for transmitting a single ACK token of the second plurality of ACK tokens in each TTI, subsequent the second TTI.

24. The apparatus of claim 21, wherein determining the first number of the first plurality of ACK tokens is further based on an average time spent in a downlink PDCP reordering window by the TCP packets in the burst of TCP packets.

25. The apparatus of claim 21, further comprising:

means for determining, based on the amount of data used to acknowledge the TCP packets, a third number of a third plurality of ACK tokens to transmit in a third TTI, wherein the third TTI is subsequent to the first TTI and before the second TTI, and wherein the third plurality of ACK tokens corresponds to fourth data in one or more TCP packets of the burst of TCP packets; and means for transmitting the third plurality of ACK tokens in the third TTI.

26. The apparatus of claim 25, wherein determining the third number of the third plurality of ACK tokens comprises:
means for determining a minimum of:
a second threshold number of ACK tokens, wherein the second threshold number is different than the first threshold number; and
a quotient of one-half a remainder of the amount of data divided by a size of each ACK token.

27. A non-transitory computer readable medium comprising computer-executable instructions that, when executed by a processor of a user equipment (UE), cause the UE to perform a method of wireless communications, comprising:
obtaining a burst of transmission control protocol (TCP) packets conveying packet data convergence protocol (PDCP) protocol data units (PDUs) by an application protocol TCP layer of a communication protocol stack of a user equipment (UE);

determining, based on an amount of data used to acknowledge (ACK) the burst of TCP packets, a first number of a first plurality of ACK tokens to transmit in a first transmission time interval (TTI), wherein the first plurality of ACK tokens corresponds to first data in one or more TCP packets of the burst of TCP packets, and wherein a maximum number of ACK tokens that can be transmitted in the first TTI is equal to a first threshold number of ACK tokens, wherein determining the first number of the first plurality of ACK tokens comprises determining a minimum of:
the first threshold number of ACK tokens, and
a quotient of one-half of the amount of data divided by a size of each ACK token;
transmitting the first plurality of ACK tokens in the first TTI; and
transmitting a single ACK token in a second TTI subsequent to the first TTI, wherein the single ACK token corresponds to second data in one or more TCP packets of the burst of TCP packets.

* * * * *